United States Patent
Chen et al.

(10) Patent No.: US 10,897,289 B2
(45) Date of Patent: Jan. 19, 2021

(54) SIGNAL TRANSMISSION METHOD AND BASE STATION

(71) Applicant: HUAWEI TECHNOLOGIES CO., LTD., Guangdong (CN)

(72) Inventors: Shuai Chen, Shanghai (CN); Wei Chen, Shanghai (CN); Xiaolong Zhu, Shanghai (CN); Yu Wu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/358,301

(22) Filed: Mar. 19, 2019

(65) Prior Publication Data
US 2019/0215042 A1 Jul. 11, 2019

Related U.S. Application Data

(63) Continuation of application No. PCT/CN2016/099307, filed on Sep. 19, 2016.

(51) Int. Cl.
*H04B 7/0456* (2017.01)
*H04B 7/06* (2006.01)
*H04L 5/00* (2006.01)

(52) U.S. Cl.
CPC ......... *H04B 7/0473* (2013.01); *H04B 7/0465* (2013.01); *H04B 7/0469* (2013.01); *H04B 7/06* (2013.01); *H04L 5/0051* (2013.01)

(58) Field of Classification Search
CPC ...... H04B 7/0473; H04B 7/06; H04B 7/0465; H04B 7/0469; H04B 7/0456; H04L 5/0051
See application file for complete search history.

(56) References Cited

U.S. PATENT DOCUMENTS 9,065,515 B2   6/2015  Le Pezennec et al.
9,577,726 B2 * 2/2017  Zhang .................... H04W 52/04
(Continued)

FOREIGN PATENT DOCUMENTS

CN   101854712 A   10/2010
CN   103391128 A   11/2013
(Continued)

OTHER PUBLICATIONS

PCT International Search Report and Written Opinion issued in International Application No. PCT/CN2016/099307 dated Jun. 20, 2017, 17 pages (with English translation).
(Continued)

*Primary Examiner* — Curtis A Alia
(74) *Attorney, Agent, or Firm* — Fish & Richardson P.C.

(57) ABSTRACT

A signal transmission method includes: processing, by a base station, a first baseband signal, a second baseband signal, a third baseband signal, and a fourth baseband signal by using a VAM matrix, to obtain four processed signals; performing precoding processing on the four processed signals to obtain four coded signals; and sending the four coded signals to a mobile terminal by using four radio frequency ports. The four radio frequency ports are in a one-to-one correspondence with the four coded signals. A first processed signal is the same as a third processed signal, a second processed signal is the same as a fourth processed signal. The first processed signal is obtained by performing superposition on the first baseband signal and the third baseband signal, and the second processed signal is obtained by performing superposition on the second baseband signal and the fourth baseband signal.

11 Claims, 4 Drawing Sheets

(56) References Cited

U.S. PATENT DOCUMENTS

| | | | |
|---|---|---|---|
| 2010/0220801 A1 | 9/2010 | Lee et al. | |
| 2013/0044650 A1* | 2/2013 | Barker | H04B 7/0469 370/278 |
| 2013/0100997 A1 | 4/2013 | Wang et al. | |
| 2014/0098689 A1 | 4/2014 | Lee et al. | |
| 2015/0304076 A1* | 10/2015 | Lee | H04L 5/005 370/329 |
| 2015/0326293 A1 | 11/2015 | Lee et al. | |
| 2016/0013843 A1 | 1/2016 | Zhang et al. | |
| 2016/0149619 A1 | 5/2016 | Won et al. | |

FOREIGN PATENT DOCUMENTS

| | | |
|---|---|---|
| CN | 103718475 A | 4/2014 |
| CN | 104170478 A | 11/2014 |
| EP | 2958381 A1 | 12/2015 |
| JP | 2010519794 A | 6/2010 |
| JP | 2013535138 A | 9/2013 |
| WO | 2008098092 A2 | 8/2008 |
| WO | 2015171521 A1 | 11/2015 |

OTHER PUBLICATIONS

Office Action issued in Chinese Application No. 201680088955.4 dated Mar. 19, 2020, 7 pages.
Extended European Search Report issued in European Application No. 16916053.8 dated Jul. 4, 2019, 8 pages.
Office Action issued in Japanese Application No. 2019-515326 dated Jul. 27, 2020, 7 pages (with English translation).

* cited by examiner

SIGNAL TRANSMISSION METHOD AND BASE STATION

CROSS-REFERENCE TO RELATED APPLICATIONS

This application is a continuation of International Patent Application No. PCT/CN2016/099307, filed on Sep. 19, 2016, the disclosure of which is hereby incorporated by reference in its entirety.

TECHNICAL FIELD

Embodiments of the present invention relate to the wireless communications field, and more specifically, to a signal transmission method and a base station.

BACKGROUND

A multi-antenna transmission technology means that a plurality of antennas are used to send and receive data at a transmit end and a receive end. The multi-antenna transmission technology can make full use of space resources, increase effective bandwidth of a radio channel, greatly increase a capacity of a communications system, and accelerate a transmission rate of a local area network. Currently, the multi-antenna technology has been introduced into a 3rd Generation Partnership Project (3GPP) Long Term Evolution (LTE) technical specification as an important feature. As network applications rapidly develop, a multi-antenna wireless network device is a better choice.

In a solution of the prior art, if power cannot be doubled in a process in which 2T (Transmit) 2R (Receive) is evolved into 4T4R, for example, power in 2T2R is 2×40 W, and due to costs, the power cannot be converted to 4×40 W after 2T2R is evolved into 4T4R, and can only be set to 4×20 W, power of a cell-specific reference signal (CRS) needs to be reduced to ensure that power of outputting a signal does not exceed a capability of a radio frequency power amplifier (PA). Consequently, pilot coverage is decreased, and an LTE user performs cell handover or reselects a neighboring cell, or network disconnection and call drop are caused. As a result, user experience of a terminal is affected.

SUMMARY

Embodiments of the present invention provide a signal transmission method and a base station, to improve a pilot coverage capability in a multi-antenna technology.

According to a first aspect, a signal transmission method is provided, including: processing, by a base station, a first baseband signal, a second baseband signal, a third baseband signal, and a fourth baseband signal by using a virtual antenna mapping (VAM) matrix, to obtain four processed signals, where the four processed signals include a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal; performing, by the base station, precoding processing on the four processed signals to obtain four coded signals; and sending, by the base station, the four coded signals to a mobile terminal by using four radio frequency ports, where the four radio frequency ports are in a one-to-one correspondence with the four coded signals.

In this embodiment of the present invention, virtual antenna mapping processing and precoding processing are performed on the four baseband signals, and each coded signal is sent to the mobile terminal by using a corresponding radio frequency port. Therefore, during multi-antenna evolution, there is no need to reduce power of a cell-specific reference signal to ensure that power of transmitting a signal on a radio frequency channel does not exceed a threshold, so that a pilot coverage capability in a multi-antenna technology can be improved.

With reference to the first aspect, in an implementation of the first aspect, the VAM matrix is:

$$\frac{1}{\sqrt{2}}\begin{bmatrix} 1 & 0 & 1 & 0 \\ 0 & 1 & 0 & 1 \\ 1 & 0 & 1 & 0 \\ 0 & 1 & 0 & 1 \end{bmatrix}.$$

With reference to the first aspect and the foregoing implementation of the first aspect, in another implementation of the first aspect, the VAM matrix is any one of the following matrices:

$$\frac{1}{\sqrt{2}}\begin{bmatrix} 1 & 0 & \exp(j*pi/6) & 0 \\ 0 & 1 & 0 & \exp(j*pi/6) \\ 1 & 0 & \exp(j*pi/6) & 0 \\ 0 & 1 & 0 & \exp(j*pi/6) \end{bmatrix},$$

$$\frac{1}{\sqrt{2}}\begin{bmatrix} 1 & 0 & \exp(j*pi/4) & 0 \\ 0 & 1 & 0 & \exp(j*pi/4) \\ 1 & 0 & \exp(j*pi/4) & 0 \\ 0 & 1 & 0 & \exp(j*pi/4) \end{bmatrix},$$

$$\frac{1}{\sqrt{2}}\begin{bmatrix} 1 & 0 & \exp(j*pi/3) & 0 \\ 0 & 1 & 0 & \exp(j*pi/3) \\ 1 & 0 & \exp(j*pi/3) & 0 \\ 0 & 1 & 0 & \exp(j*pi/3) \end{bmatrix}, \text{or}$$

$$\frac{1}{\sqrt{2}}\begin{bmatrix} 1 & 0 & j & 0 \\ 0 & 1 & 0 & j \\ 1 & 0 & -j & 0 \\ 0 & 1 & 0 & -j \end{bmatrix}.$$

When configuration information and power that can be provided by the radio frequency channel are specific, if the baseband signal is not processed by using the VAM matrix, the power of outputting a signal by the radio frequency channel may exceed the threshold, and consequently normal signal transmission cannot be implemented. In this embodiment of the present invention, VAM processing is performed on the baseband signal, so that power of transmitting each coded signal obtained after the processing to the mobile terminal by using the radio frequency port can meet a requirement, and normal signal transmission can be ensured.

In an embodiment of the present invention, the processing a first baseband signal, a second baseband signal, a third baseband signal, and a fourth baseband signal by using a VAM matrix may be: multiplying a 4×4 VAM matrix and a 4×1 matrix consisting of the four baseband signals, to obtain the four processed signals corresponding to the 4×1 matrix.

With reference to the first aspect and the foregoing implementations of the first aspect, in another implementation of the first aspect, the base station is an evolved NodeB (eNB) in Long Term Evolution (LTE).

With reference to the first aspect and the foregoing implementations of the first aspect, in another implementation of the first aspect, the method further includes: determining, by the base station based on configuration information and power that can be provided by a radio frequency channel, to process the first baseband signal, the second baseband signal, the third baseband signal, and the fourth baseband signal by using the VAM matrix.

When it can be learned, through calculation by using the configuration information, that the baseband signals are not to be processed by using the VAM matrix, if power of transmitting each baseband signal by using the radio frequency port is greater than the power that can be provided by the radio frequency channel, normal signal transmission cannot be implemented by using the prior art. In this case, the baseband signals can be processed and transmitted by using the solution of the present invention. Otherwise, the baseband signals can be processed and transmitted by using an existing solution.

In an embodiment of the present invention, the same VAM matrix is used for each of the four baseband signals during transmission on all channels.

In an embodiment of the present invention, N baseband signals may be further processed by using the solution of the present invention, so that power of outputting a signal by each radio frequency port is not greater than the power that can be provided by the radio frequency channel, and N may be an integer greater than 4. In this case, each row of the VAM matrix includes at least two non-zero elements, so that each baseband signal can be output from at least two ports.

In an embodiment of the present invention, non-zero elements in each column of the VAM matrix are the same or are opposite numbers. In this way, baseband signals can be equally allocated to four or N radio frequency output ports.

According to a second aspect, a base station is provided, including: a virtual antenna mapping VAM processing unit, configured to process a first baseband signal, a second baseband signal, a third baseband signal, and a fourth baseband signal by using a VAM matrix, to obtain four processed signals, where the four processed signals include a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal; a precoding processing unit, configured to perform precoding processing on the four processed signals obtained by the VAM processing unit, to obtain four coded signals; and a sending unit, configured to send, to a mobile terminal by using four radio frequency ports, the four coded signals obtained by the precoding processing unit, where the four radio frequency ports are in a one-to-one correspondence with the four coded signals.

In this embodiment of the present invention, virtual antenna mapping processing and precoding processing are performed on the four baseband signals, and each coded signal is sent to the mobile terminal by using a corresponding radio frequency port. Therefore, during multi-antenna evolution, there is no need to reduce power of a cell-specific reference signal to ensure that power of transmitting a signal on a radio frequency channel does not exceed a threshold, so that a pilot coverage capability in a multi-antenna technology can be improved.

With reference to the second aspect, in an implementation of the second aspect, the VAM matrix is:

$$\frac{1}{\sqrt{2}}\begin{bmatrix} 1 & 0 & 1 & 0 \\ 0 & 1 & 0 & 1 \\ 1 & 0 & 1 & 0 \\ 0 & 1 & 0 & 1 \end{bmatrix}.$$

With reference to the second aspect and the foregoing implementation of the second aspect, in another implementation of the second aspect, the VAM matrix is any one of the following matrices:

$$\frac{1}{\sqrt{2}}\begin{bmatrix} 1 & 0 & \exp(j*pi/6) & 0 \\ 0 & 1 & 0 & \exp(j*pi/6) \\ 1 & 0 & \exp(j*pi/6) & 0 \\ 0 & 1 & 0 & \exp(j*pi/6) \end{bmatrix},$$

$$\frac{1}{\sqrt{2}}\begin{bmatrix} 1 & 0 & \exp(j*pi/4) & 0 \\ 0 & 1 & 0 & \exp(j*pi/4) \\ 1 & 0 & \exp(j*pi/4) & 0 \\ 0 & 1 & 0 & \exp(j*pi/4) \end{bmatrix},$$

$$\frac{1}{\sqrt{2}}\begin{bmatrix} 1 & 0 & \exp(j*pi/3) & 0 \\ 0 & 1 & 0 & \exp(j*pi/3) \\ 1 & 0 & \exp(j*pi/3) & 0 \\ 0 & 1 & 0 & \exp(j*pi/3) \end{bmatrix}, \text{ or}$$

$$\frac{1}{\sqrt{2}}\begin{bmatrix} 1 & 0 & j & 0 \\ 0 & 1 & 0 & j \\ 1 & 0 & -j & 0 \\ 0 & 1 & 0 & -j \end{bmatrix}.$$

With reference to the second aspect and the foregoing implementations of the second aspect, in another implementation of the second aspect, the base station is an evolved NodeB (eNB) in Long Term Evolution (LTE).

With reference to the second aspect and the foregoing implementations of the second aspect, in another implementation of the second aspect, the base station includes: a determining unit, configured to determine, based on configuration information and power that can be provided by a radio frequency channel, to process the first baseband signal, the second baseband signal, the third baseband signal, and the fourth baseband signal by using the VAM matrix.

In an embodiment of the present invention, a control switch may be added to determine whether to process and transmit a baseband signal by using the solution of the present invention. When the determining unit learns, through calculation by using the configuration information, that the baseband signals are not to be processed by using the VAM matrix, if power of transmitting each baseband signal by using a radio frequency port is greater than the power that can be provided by the radio frequency channel when the baseband signal is processed without using the VAM matrix, the baseband signals may be processed and transmitted by using the solution of the present invention. Otherwise, the baseband signals can be processed and transmitted by using an existing solution.

The base station provided in the second aspect of the embodiments of the present invention may be configured to perform the method according to any one of the first aspect or the possible implementations of the first aspect. Specifically, the base station includes units configured to perform the method according to any one of the first aspect or the possible implementations of the first aspect. Beneficial effects of the units also correspond to beneficial effects of steps in the first aspect. To avoid repetition, details are not described herein again.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to the following communications system, for example, a Long Term Evolution (LTE) system and a future wireless communications system. The LTE system includes an LTE frequency division duplex (FDD) system, an LTE time division duplex (TDD) system, and the like. In the embodiments of the present invention, the LTE system is used as an example for description.

User equipment (UE) in the embodiments of the present invention may be referred to as a terminal (Terminal), a mobile station (MS), a mobile terminal (Mobile Terminal), or the like. The user equipment may communicate with one or more core networks through a radio access network (RAN). For example, the user equipment may be a mobile phone (or referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

A base station in the embodiments of the present invention may be an evolved NodeB (eNB) in LTE, or may be a base station in a future wireless communications system.

Figure 1:
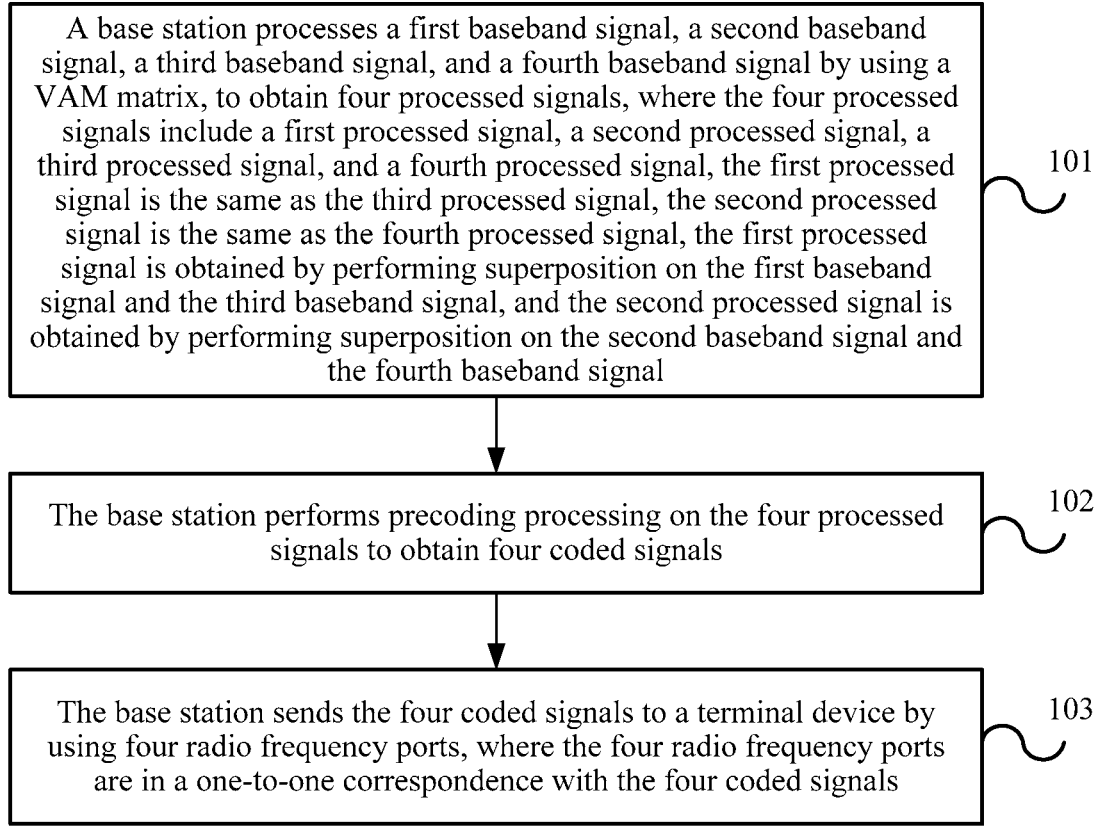
FIG. 1 is a schematic flowchart of a signal transmission method according to an embodiment of the present invention.

FIG. 1 is a schematic flowchart of a signal transmission method according to an embodiment of the present invention.

101. A base station processes a first baseband signal, a second baseband signal, a third baseband signal, and a fourth baseband signal by using a VAM matrix, to obtain four processed signals. The four processed signals include a first processed signal, a second processed signal, a third processed signal, and a fourth processed signal. The first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal.

The baseband signal in this embodiment of the present invention may be a cell-specific reference signal (CRS), a signal transmitted on a physical downlink shared channel (PDSCH), a signal transmitted on a packet broadcast control channel (PBCCH), a signal transmitted on a physical downlink control channel (PDCCH), a signal transmitted on a physical hybrid ARQ indicator channel PHICH), a signal transmitted on a physical control format indicator channel (PCFICH), a primary synchronization signal (PSS), a secondary synchronization signal (SSS), or the like.

In a 3GPP LTE protocol, a Type-A symbol indicates a resource element (RE) symbol that includes no pilot bit and that is used to send a non-pilot signal in a symbol column, and a Type-B symbol indicates an RE symbol that includes a pilot bit and that is used to send a non-pilot signal in a symbol column. Pa represents an offset of signal power of an RE of the Type-A symbol that is used to send a non-pilot signal relative to signal power of an RE that is used to send a pilot signal. For example, Pa=0 indicates that the signal power of the RE that is used to send a non-pilot signal is equal to the signal power of the RE that is used to send a pilot signal. Pa=−3 indicates that the signal power of the RE that is used to send a non-pilot signal is 3 dBm lower than the signal power of the RE that is used to send a pilot signal. Pb represents an indicator value of a ratio of power of transmitting a signal by using the Type-A symbol to power of transmitting a signal by using the Type-B symbol. For example, when the ratio of power of transmitting a signal by using the Type-A symbol to power of transmitting a signal by using the Type-B symbol is 2, the corresponding indicator value Pb is equal to 3; when the ratio of power of transmitting a signal by using the Type-A symbol to power of transmitting a signal by using the Type-B symbol is 4/3, the corresponding indicator value Pb is equal to 2; when the ratio of power of transmitting a signal by using the Type-A symbol to power of transmitting a signal by using the Type-B symbol is 1, the corresponding indicator value Pb is equal to 1; and when the ratio of power of transmitting a signal by using the Type-A symbol to power of transmitting a signal by using the Type-B symbol is 1.25, the corresponding indicator value Pb is equal to 0.

If the baseband signal is not processed by using the VAM matrix, signal power of transmitting the baseband signal by using a radio frequency channel may be obtained through calculation by using configuration information. The configuration information may include bandwidth, power of a CRS, and values of Pa and Pb.

After a series of processing is performed on the baseband signal and before the processed baseband signal is sent to a receive end, in other words, in a pre-stage circuit of a transmitter, power of a radio frequency signal generated by a modulation oscillation circuit is very small, a series of power amplification operations need to be performed, and the radio frequency signal can be fed to an antenna for transmission only after sufficient radio frequency power is obtained. To obtain large enough radio frequency output power, a radio frequency power amplifier needs to be used.

In an embodiment of the present invention, it can be first determined that the VAM matrix is used to process the first baseband signal, the second baseband signal, the third baseband signal, and the fourth baseband signal. Specifically, the base station may determine, based on the configuration information and power that can be provided by the radio frequency channel, whether to use the VAM matrix to process the four baseband signals. In actual design, a control switch may be added. When it is learned, through calculation by using the configuration information, that the baseband signals are not to be processed by using the VAM matrix, if a power of transmitting each baseband signal by using a radio frequency port is greater than the power that can be provided by the radio frequency channel, normal signal transmission cannot be implemented by using the prior art. In this case, the baseband signals can be processed and transmitted by using the solution of the present invention. Otherwise, the baseband signals can be processed and transmitted by using an existing solution.

In this embodiment of the present invention, the power that can be provided by the radio frequency channel, namely, maximum output power that can be provided by the radio frequency channel, may be less than or equal to maximum output power of the radio frequency power amplifier. For example, a time-frequency transmission resource may be a single carrier or a plurality of carriers. When the time-frequency resource is a single carrier, the maximum output power that can be provided by the radio frequency channel may be equal to the maximum output power of the radio frequency power amplifier. When the time-frequency resource is a plurality of carriers, a sum of maximum output power that can be provided by the radio frequency power amplifier for each radio frequency channel may be equal to the maximum output power of the radio frequency power amplifier. In other words, when the time-frequency resource is a plurality of carriers, maximum output power that can be provided by each radio frequency channel is less than the maximum output power of the radio frequency power amplifier.

In an embodiment of the present invention, using the VAM matrix to process the baseband signals may be as follows: multiplying a 4×4 VAM matrix and a 4×1 matrix consisting of the four baseband signals, to obtain a 4×1 matrix consisting of the four processed signals. In an embodiment of the present invention, the same VAM matrix is used for each of the four baseband signals during transmission on all channels.

In an embodiment of the present invention, each baseband signal may be represented as follows: a corresponding signal sequence is multiplied by power of a corresponding signal that is on the radio frequency channel and that is not processed by using the VAM matrix. The four baseband signals may constitute the 4×1 matrix.

In an embodiment of the present invention, when the baseband signals are not processed by using the VAM matrix, the power of transmitting each baseband signal by using the radio frequency port may be greater than a capability of the radio frequency power amplifier and not meet a transmission requirement, and the signal cannot be transmitted by using the existing solution. In this case, the technical solution of the present invention may be used, and VAM processing is performed on the baseband signals, so that power of transmitting a signal by using a radio frequency port meets the transmission requirement, thereby ensuring normal signal transmission.

In an embodiment of the present invention, before step 101, the method may further include: obtaining the first baseband signal, the second baseband signal, the third baseband signal, and the fourth baseband signal.

102. The base station performs precoding processing on the four processed signals to obtain four coded signals.

The performing precoding processing on the four processed signals may be as follows: multiplying the four processed signals and a corresponding precoding matrix. The precoding matrix may be a used codebook obtained based on precoding matrix indication (PMI) information.

103. The base station sends the four coded signals to a mobile terminal by using four radio frequency ports, where the four radio frequency ports are in a one-to-one correspondence with the four coded signals.

The four coded signals are sent to the mobile terminal by using the four radio frequency ports. One radio frequency port is used to send one coded signal, and each coded signal is obtained by using at least two baseband signals. In other words, each radio frequency port is used to send a part of each of the at least two baseband signals. Therefore, each baseband signal is sent by using at least two radio frequency ports, to implement normal transmission of a baseband signal whose power does not meet the transmission requirement.

In this embodiment of the present invention, virtual antenna mapping processing and precoding processing are performed on the four baseband signals, and each coded signal is sent to the mobile terminal by using a corresponding radio frequency port. Therefore, during multi-antenna evolution, there is no need to reduce power of a cell-specific reference signal to ensure that power of transmitting a signal on a radio frequency channel does not exceed a threshold, so that a pilot coverage capability in a multi-antenna technology can be improved.

In the solution of the prior art, when power cannot be doubled in a process of upgrading 2T to 4T, the power of the CRS can be reduced to ensure that the maximum power of the radio frequency channel does not exceed the capability of the radio frequency power amplifier. Due to such configuration, pilot coverage of LTE is zoomed out, and consequently, a pilot coverage capability in a multi-antenna technology is reduced. According to the technical solution of the present invention, in a process of upgrading 2T to 4T, it can be ensured that the maximum power of the radio frequency channel does not exceed the capability of the radio frequency power amplifier and CRS configuration remains unchanged. In other words, the coverage capability in the multi-antenna technology remains unchanged. In other words, according to the technical solution of the present invention, the coverage capability in the multi-antenna technology may remain unchanged in the process of upgrading 2T to 4T. Compared with the multi-antenna (for example, 4T) technology in the existing solution, the multi-antenna (for example, 4T) technology in the technical solution of the present invention can improve the pilot coverage capability.

In an embodiment of the present invention, the base station may be an eNB in LTE, or may be a base station in a wireless communications system that may be applied to the present invention in the future.

In the existing solution, configuration of Pa and Pb may be modified, so that power of transmitting a signal by using a radio frequency port does not exceed the capability of the radio frequency power amplifier. For example, when bandwidth is 20 M, and power remains at 20 W and cannot be doubled in the process of upgrading 2T to 4T, configuration of the CRS may remain at 18.2 dBm, and Pa=−3 and Pb=1 in 2T are modified to Pa=−6 and Pb=3. However, such a configuration modification causes power reduction of the Type-B symbol. Consequently, power of a control signal or a physical downlink shared channel on the Type-B symbol is reduced, and network performance index is reduced. According to this embodiment of the present invention, normal signal transmission can be still performed in the process of upgrading 2T to 4T and configured values of the CRS and Pb remain unchanged, and the configuration may not change when the power does not exceed a threshold. In other words, it is ensured that the performance is not affected.

In an embodiment of the present invention, there may be N baseband signals, and N may be an integer greater than 4. In this case, each row of the VAM matrix includes at least two non-zero elements. In this case, each baseband signal may be allocated to at least two radio frequency ports for sending. In this embodiment of the present invention, only four baseband signals are used as an example for description.

The following describes the embodiments of the present invention in more detail with reference to specific examples. It should be noted that these examples are merely intended to help a person skilled in the art better understand the embodiments of the present invention, instead of limiting the scope of the embodiments of the present invention.

Figures 1, 2:
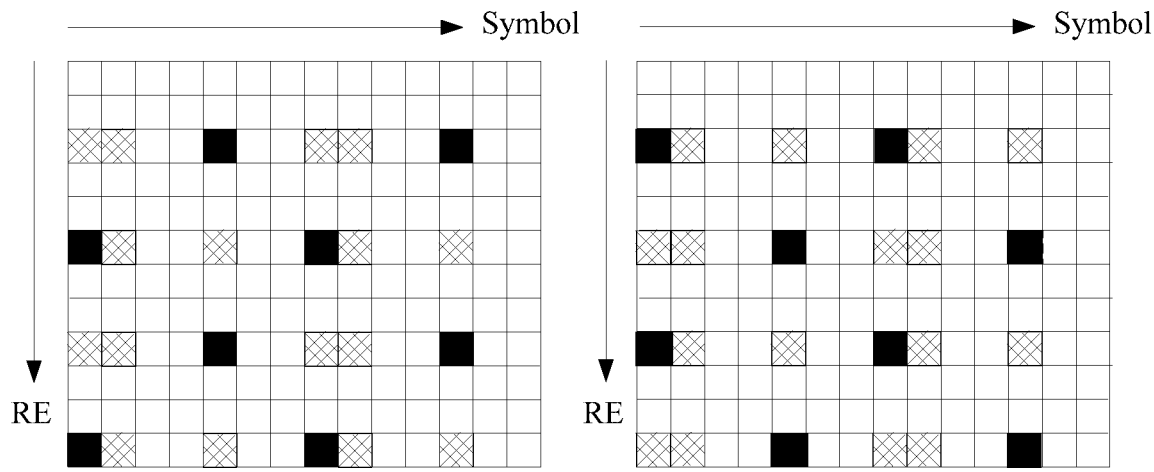
FIG. 2 is a pilot pattern of different ports of four antennas according to an embodiment of the present invention.

FIG. 2 is a pilot pattern of different ports of four antennas according to an embodiment of the present invention.

In a 3GPP LTE protocol, a Type-A symbol indicates an RE symbol that includes no pilot bit and that is used to send a non-pilot signal in a symbol column, and a Type-B symbol indicates an RE symbol that includes pilot bit and that is used to send a non-pilot signal in a symbol column. A port (port) 0, a port 1, a port 2, and a port 3 are respectively used to represent four antenna ports (antenna port). FIG. 2-1, FIG. 2-2, FIG. 2-3, and FIG. 2-4 respectively represent pilot patterns of the four antenna ports. In two timeslots of FIG. 2, one small box is one RE. A small black box indicates that the RE is a pilot bit, and the RE is used to send pilot bit in a baseband signal in which the RE is located. A small shadow box indicates that the RE is a pilot bit, but the RE is not used to send pilot bit in the baseband signal. A small white box indicates that the RE is used to send a Type-A signal or a Type-B signal. Each small box in FIG. 2 represents one RE, one RB includes 12 REs, and each column is one RB. A horizontal small box represents one orthogonal frequency division multiplexing (OFDM) symbol, and OFDM symbols are sequentially numbered from 0.

In FIG. 2, a black block is used to indicate that the RE is used to send pilot bit, a shadow part is used to indicate that the RE neither sends a non-pilot signal nor sends pilot bit, and a white block is used to indicate that the RE is used to send a non-pilot signal. According to the protocol, at least one of four baseband signals is used to send pilot bit at any pilot bit, and other signals neither send a non-pilot signal nor send pilot bit.

Neither a first baseband signal nor a second baseband signal may be used to send pilot bit on a same symbol that includes a pilot bit, for example, an OFDM symbol numbered 1 in a second column in FIG. 2-1 and FIG. 2-2. In this case, a third baseband signal and a fourth baseband signal may be used to send pilot bit signals at pilot bits, for example, an OFDM symbol numbered 1 in a second column in FIG. 2-3 and FIG. 2-4. In addition, for a same symbol that includes a pilot bit, a subcarrier of the symbol on which the first baseband signal is used to send pilot bit is different from a subcarrier of the symbol on which the second baseband signal is used to send pilot bit. In addition, the subcarrier of the symbol on which the first baseband signal is used to send pilot bit and the subcarrier of the symbol on which the second baseband signal is used to send pilot bit jointly constitute all subcarriers used for the pilot bit on the symbol. For example, a first column in each of FIG. 2-1 and FIG. 2-2 includes four pilot bit REs in total that can be used to send pilot bit. There are two REs used to send pilot bit in the first baseband signal in FIG. 2-1, and there are also two REs used to send pilot bit in the second baseband signal in FIG. 2-2. However, locations of the REs that are used to send pilot bit in the two baseband signals do not overlap.

Figures 2, 3, 4:
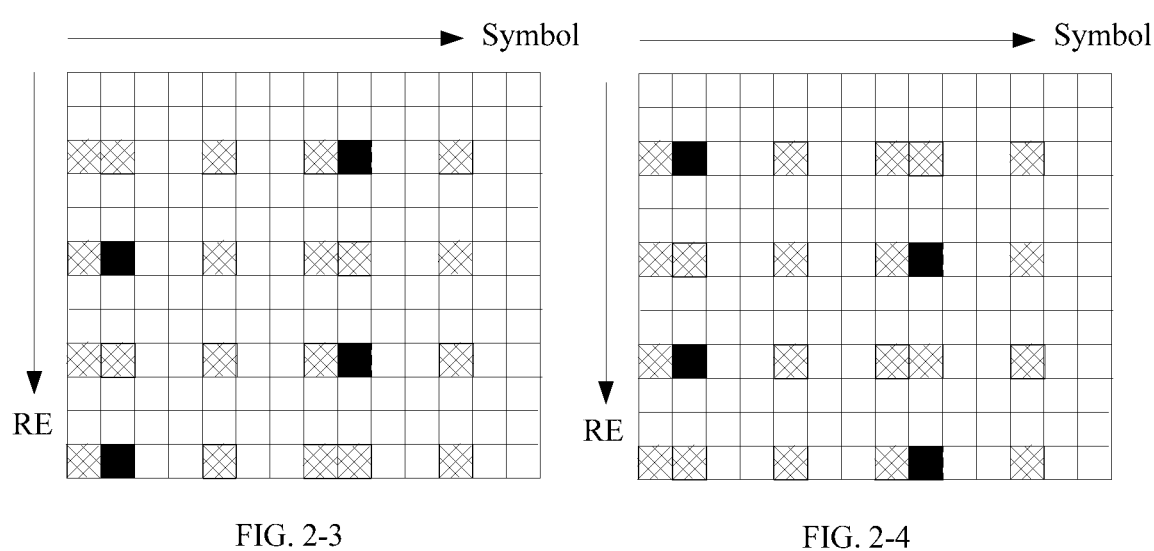
FIG. 3 is a schematic diagram of signal transmission according to another embodiment of the present invention.
FIG. 4 is a block diagram of a base station according to an embodiment of the present invention.
Figure 3:
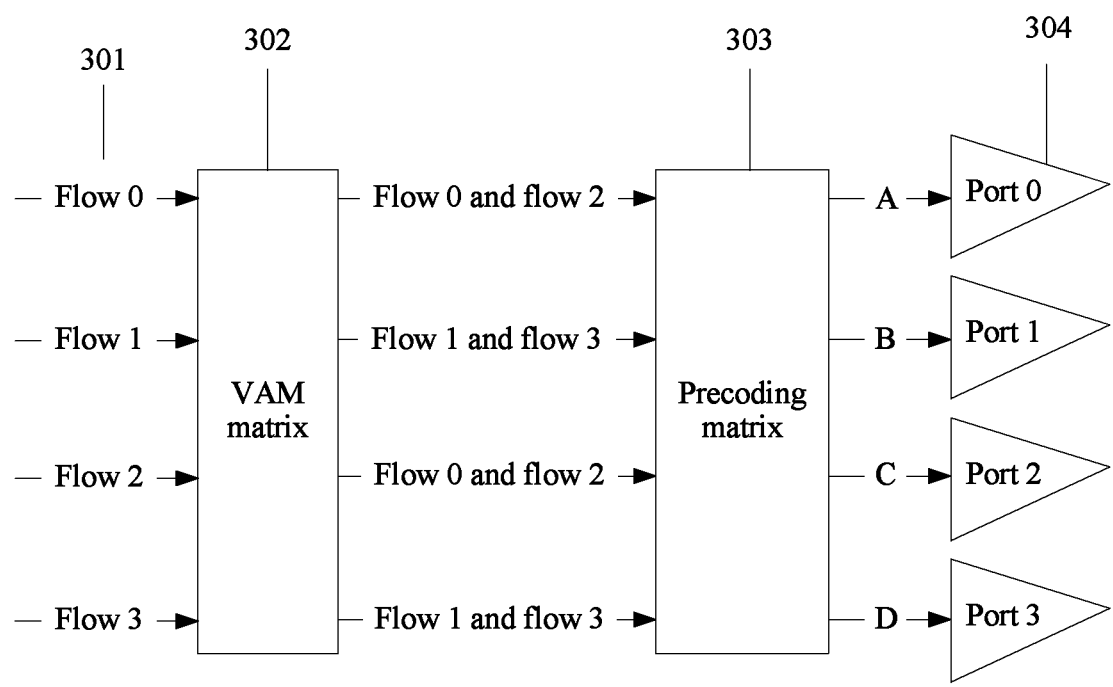
Figure 4:
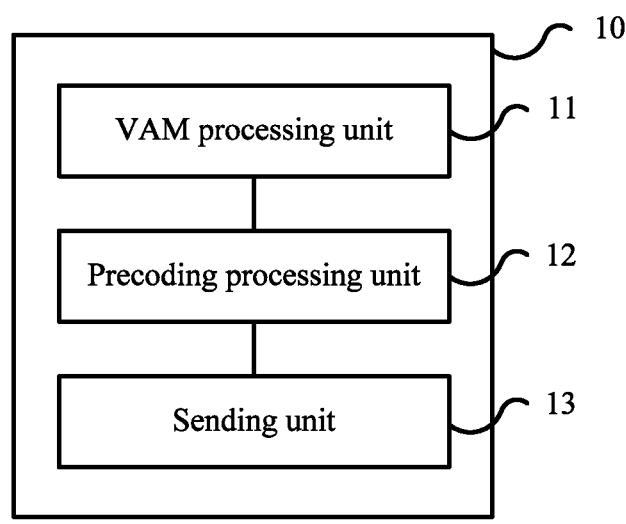

In this way, in the first column in FIG. 2-1, an OFDM symbol numbered 0 includes two REs used to send pilot bit, eight REs used to send a non-pilot Type-B signal, and two REs neither used to send a non-pilot signal nor used to send pilot bit. Likewise, in the first column in FIG. 2-2, an OFDM symbol numbered 0 includes two REs used to send pilot bit, eight REs used to send a non-pilot Type-B signal, and two REs neither used to send a non-pilot signal nor used to send pilot bit. In this way, power of transmitting a signal on the OFDM symbol numbered 0 in FIG. 2-1 is the same as power of transmitting a signal on the OFDM symbol numbered 0 in FIG. 2-2 when different radio frequency ports are used. Likewise, power of transmitting a signal on an OFDM symbol numbered 0 in FIG. 2-3 is the same as power of transmitting a signal on an OFDM symbol numbered 0 in FIG. 2-4 when different radio frequency ports are used.

The following uses an example in which bandwidth is 20 M, power of a CRS is 18.2 dBm, Pa=−6, and Pb=1 in configuration information in 4T4R to describe signal power of transmitting, on each symbol by using one RB and different radio frequency ports, a signal that is not processed by using a VAM matrix. The power of the CRS is set to 18.2 dBm. In other words, signal power at which one RE that is used to send pilot bit transmits a signal is 18.2 dBm. With reference to Pa=−6, signal power at which one RE that is used to send a non-pilot Type-A signal transmits a signal is 12.2 dBm. If Pb=1, power of transmitting a signal by using the Type-A symbol is the same as power of transmitting a signal by using the Type-B symbol, and the power is equal to 12.2 dBm. A flow 0, a flow 1, a flow 2, and a flow 3 are respectively used to represent the four baseband signals. In FIG. 2-1, signal power of transmitting, on a resource of the symbol (a first symbol) numbered 0 in time domain and one RB (the first column in FIG. 2-1) in frequency domain by using a first radio frequency port, a signal that is not processed by using the VAM matrix is: 18.2 dBm×2+8×12.2 dBm=24.2 dBm. Considering that the bandwidth is 20 M, and 100 RBs need to be used, total power of transmitting a signal on the first symbol by using the first radio frequency port A in FIG. 2-1 is: 44.2 dBm=26.49 W. It should be noted that a unit dBm cannot be directly added and first needs to be converted into milliwatt before addition, and a unit of an addition result is then converted into watt (W).

Likewise, in FIG. 2-1, signal power of transmitting, on a resource of a second symbol and one RB by using the first radio frequency port, a signal that is not processed by using the VAM matrix is: 8×12.2 dBm=21.2 dBm. Then, considering that the bandwidth is 20 M, and 100 RBs are used in total, namely, 100 times of 21.2 dBm, total power of transmitting a signal on the second symbol by using the first radio frequency port A in FIG. 2-1 is 41.2 dBm, and is equal to 13.28 W after unit conversion.

In FIG. 2-1, signal power of transmitting, on a resource of a third symbol and one RB by using the first radio frequency port, a signal that is not processed by using the VAM matrix is: 12×12.2 dBm=22.99 dBm. Then, considering that the bandwidth is 20 M, and 100 RBs are used in total, namely, 100 times of 22.99 dBm, total power of transmitting a signal on the third symbol by using the first radio frequency port A in FIG. 2-1 is 42.99 dBm, and is equal to 19.92 W after unit conversion.

By analogy, when the bandwidth is 20 M, total power of transmitting, on 14 symbols by using the first radio frequency port, signals that are not processed by using the VAM matrix are respectively 26.49 dBm, 13.28 dBm, 19.92 dBm, 19.92 dBm, 26.49 dBm, 19.92 dBm, 19.92 dBm, 26.49 dBm, 13.28 dBm, 19.92 dBm, 19.92 dBm, 26.49 dBm, 19.92 dBm, and 19.92 dBm. Same calculation processes are applicable to other symbols and other radio frequency ports. The following Table 1 shows power of transmitting, by using various symbols, a baseband signal that is not processed by using the VAM matrix. The symbols are numbered from 0 to 13, and are successively a first symbol, a second symbol, a third symbol, . . . , and a fourteenth symbol.

TABLE 1

| | Power | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| Port 0 | 26.49 | 13.28 | 19.92 | 19.92 | 26.49 | 19.92 | 19.92 | 26.49 | 13.28 | 19.92 | 19.92 | 26.49 | 19.92 | 19.92 |
| Port 1 | 26.49 | 13.28 | 19.92 | 19.92 | 26.49 | 19.92 | 19.92 | 26.49 | 13.28 | 19.92 | 19.92 | 26.49 | 19.92 | 19.92 |
| Port 2 | 13.28 | 26.49 | 19.92 | 19.92 | 13.28 | 19.92 | 19.92 | 13.28 | 26.49 | 19.92 | 19.92 | 13.28 | 19.92 | 19.92 |
| Port 3 | 13.28 | 26.49 | 19.92 | 19.92 | 13.28 | 19.92 | 19.92 | 13.28 | 26.49 | 19.92 | 19.92 | 13.28 | 19.92 | 19.92 |

If maximum output power that can be provided by a radio frequency channel is 20 W, some power in Table 1 exceeds a capability of a radio frequency power amplifier. The corresponding baseband signal cannot be directly transmitted according to the prior art. According to this embodiment of the present invention, VAM processing can enable power obtained after the processing to be less than the maximum output power that can be provided by the radio frequency channel, to ensure normal signal transmission.

FIG. 3 is a schematic diagram of signal transmission according to another embodiment of the present invention. A method in FIG. 3 may be performed by a base station.

A port 0, a port 1, a port 2, and a port 3 respectively represent four antenna ports; a flow 0, a flow 1, a flow 2, and a flow 3 respectively represent four baseband signals; and A, B, C, and D respectively represent corresponding radio frequency output signals when signals are sent to a mobile terminal by using the four ports: the port 0, the port 1, the port 2, and the port 3.

301. Obtain four baseband signals: a flow 0, a flow 1, a flow 2, and a flow 3.

The four baseband signals: the flow 0, the flow 1, the flow 2, and the flow 3 constitute a 4×1 matrix $$\begin{bmatrix} \text{flow0} \\ \text{flow1} \\ \text{flow2} \\ \text{flow3} \end{bmatrix}.$$

302. Multiply a 4×4 VAM matrix and a 4×1 matrix consisting of the four baseband signals, to obtain four processed signals corresponding to the 4×1 matrix.

The VAM matrix may be preconfigured, and different VAM matrices may be determined based on phase rotation performed for the four baseband signals. For example, when no rotation is performed on the four baseband signals, the VAM matrix may be $$\frac{1}{\sqrt{2}} \begin{bmatrix} 1 & 0 & 1 & 0 \\ 0 & 1 & 0 & 1 \\ 1 & 0 & 1 & 0 \\ 0 & 1 & 0 & 1 \end{bmatrix}.$$

In this case, the corresponding four processed signals are as follows:

$$\frac{1}{\sqrt{2}} \begin{bmatrix} \text{flow0} + \text{flow2} \\ \text{port1} + \text{flow3} \\ \text{flow0} + \text{flow2} \\ \text{flow1} + \text{flow3} \end{bmatrix}.$$

To be specific, the four processed signals corresponding to the four radio frequency ports A, B, C, and D in FIG. 3 are successively:

$$\frac{1}{\sqrt{2}} * (\text{flow0} + \text{flow2}), \frac{1}{\sqrt{2}} * (\text{flow1} + \text{flow3}),$$

$$\frac{1}{\sqrt{2}} * (\text{flow0} + \text{flow2}), \text{ and } \frac{1}{\sqrt{2}} * (\text{flow1} + \text{flow3}).$$

In four VAM processed signals obtained after the multiplication performed by using the VAM matrix that are shown in the schematic diagram of FIG. 3, two VAM processed signals are a combination of the flow 0 and the flow 2, and the other two VAM processed signals are a combination of the flow 1 and the flow 3. It should be understood that another VAM matrix may also be used. For example, when the VAM matrix is $$\frac{1}{\sqrt{2}}\begin{bmatrix} 1 & 0 & 0 & 1 \\ 0 & 1 & 1 & 0 \\ 1 & 0 & 0 & 1 \\ 0 & 1 & 1 & 0 \end{bmatrix},$$

two of the four VAM processed signals are a combination of the flow 0 and the flow 3, and the other two VAM processed signals are a combination of the flow 1 and the flow 2. For another example, when the VAM matrix is $$\frac{1}{\sqrt{2}}\begin{bmatrix} 1 & 0 & 1 & 0 \\ 0 & 1 & 0 & 1 \\ 1 & 0 & 1 & 0 \\ 0 & 1 & 0 & 1 \end{bmatrix},$$

two of the four VAM processed signals are a combination of the flow 0 and the flow 2, and the other two VAM processed signals are a combination of the flow 1 and the flow 3.

The following Table 2 shows power at which the VAM matrix processed signals obtained by using the VAM matrix are output from the corresponding radio frequency ports. It can be learned that all power in Table 2 is less than maximum output power 20 W that can be provided by a radio frequency channel, to ensure normal signal transmission.

TABLE 2

| | Power | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| Port 0 | 19.88 | 19.88 | 19.92 | 19.92 | 19.88 | 19.92 | 19.92 | 19.88 | 19.88 | 19.92 | 19.92 | 19.88 | 19.92 | 19.92 |
| Port 1 | 19.88 | 19.88 | 19.92 | 19.92 | 19.88 | 19.92 | 19.92 | 19.88 | 19.88 | 19.92 | 19.92 | 19.88 | 19.92 | 19.92 |
| Port 2 | 19.88 | 19.88 | 19.92 | 19.92 | 19.88 | 19.92 | 19.92 | 19.88 | 19.88 | 19.92 | 19.92 | 19.88 | 19.92 | 19.92 |
| Port 3 | 19.88 | 19.88 | 19.92 | 19.92 | 19.88 | 19.92 | 19.92 | 19.88 | 19.88 | 19.92 | 19.92 | 19.88 | 19.92 | 19.92 |

For example, when phase rotation is performed on the four baseband signals by 45 degrees, the VAM matrix may be represented as:

$$\frac{1}{\sqrt{2}}\begin{bmatrix} 1 & 0 & \exp(j*pi/4) & 0 \\ 0 & 1 & 0 & \exp(j*pi/4) \\ 1 & 0 & \exp(j*pi/4) & 0 \\ 0 & 1 & 0 & \exp(j*pi/4) \end{bmatrix}.$$

For another example, when phase rotation is performed on the four baseband signals by 60 degrees, the VAM matrix may be represented as:

$$\frac{1}{\sqrt{2}}\begin{bmatrix} 1 & 0 & \exp(j*pi/3) & 0 \\ 0 & 1 & 0 & \exp(j*pi/3) \\ 1 & 0 & \exp(j*pi/3) & 0 \\ 0 & 1 & 0 & \exp(j*pi/3) \end{bmatrix}.$$

For another example, when phase rotation is performed on the four baseband signals by 90 degrees, the VAM matrix may be represented as:

$$\frac{1}{\sqrt{2}}\begin{bmatrix} 1 & 0 & j & 0 \\ 0 & 1 & 0 & j \\ 1 & 0 & -j & 0 \\ 0 & 1 & 0 & -j \end{bmatrix}.$$

For another example, when phase rotation is performed on the four baseband signals by 30 degrees, the VAM matrix may be represented as:

$$\frac{1}{\sqrt{2}}\begin{bmatrix} 1 & 0 & \exp(j*pi/6) & 0 \\ 0 & 1 & 0 & \exp(j*pi/6) \\ 1 & 0 & \exp(j*pi/6) & 0 \\ 0 & 1 & 0 & \exp(j*pi/6) \end{bmatrix}.$$

It should be understood that the VAM matrix in the foregoing embodiment is merely an example for description, and the VAM matrix is not limited to the previously given specific examples in the present invention, provided that power of each signal obtained after the VAM matrix processing can be less than the maximum output power that can be provided by the radio frequency channel. The foregoing no rotation, rotation performed by 45 degrees, rotation performed by 60 degrees, and rotation performed by 90 degrees are merely used as examples to describe phase rotation of the baseband signals. However, a rotation angle of the baseband signals is not limited in the present invention.

The VAM matrix in this embodiment of the present invention may not only meet a transmission mode (TM) 4, but also meet a TM 9 and a TM 10, and may further meet a TM 7 and a TM 8 of time division duplex (TDD).

303. Multiply a 4×4 precoding matrix and the 4×1 matrix corresponding to the four processed signals, to obtain four coded signals corresponding to the 4×1 matrix.

The precoding matrix may be preconfigured, and there may be a plurality of available precoding matrices. In actual product design, a proper precoding matrix may be selected with reference to the preset VAM matrix based on signal power obtained after precoding processing.

304. Send the four coded signals to a mobile terminal by using four radio frequency ports, where the four radio frequency ports are in a one-to-one correspondence with the four coded signals.

In this embodiment of the present invention, virtual antenna mapping processing and precoding processing are performed on the four baseband signals, and the four coded signals are sent to the mobile terminal by using the four radio frequency ports, so that power of transmitting a signal by using a radio frequency port does not exceed a capability of a radio frequency power amplifier. Therefore, during multi-antenna evolution, there is no need to reduce power of a cell-specific reference signal to ensure that power of transmitting a signal on a radio frequency channel does not exceed a threshold, so that a pilot coverage capability in a multi-antenna technology can be improved.

The foregoing describes in detail the signal transmission method according to the embodiments of the present invention with reference to FIG. 1 to FIG. 3. The following describes a signal transmission apparatus, namely, a base station, according to embodiments of the present invention with reference to FIG. 4 and FIG. 5.

FIG. 4 is a block diagram of a base station according to an embodiment of the present invention. A base station 10 in FIG. 4 includes a VAM processing unit 11, a precoding processing unit 12, and a sending unit 13.

The virtual antenna mapping VAM processing unit 11 is configured to process a first baseband signal, a second baseband signal, a third baseband signal, and a fourth baseband signal by using a VAM matrix, to obtain four processed signals, where the four processed signals include a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal;

The precoding processing unit 12 is configured to perform precoding processing on the four processed signals obtained by the VAM matrix processing unit, to obtain four coded signals.

The sending unit 13 is configured to send, to a mobile terminal by using four radio frequency ports, the four coded signals obtained by the precoding processing unit, where the four radio frequency ports are in a one-to-one correspondence with the four coded signals.

In this embodiment of the present invention, virtual antenna mapping processing and precoding processing are performed on the four baseband signals, and each coded signal is sent to the mobile terminal by using a corresponding radio frequency port. Therefore, during multi-antenna evolution, there is no need to reduce power of a cell-specific reference signal to ensure that power of transmitting a signal on a radio frequency channel does not exceed a threshold, so that a pilot coverage capability in a multi-antenna technology can be improved.

The base station according to this embodiment of the present invention may correspond to the signal transmission method in the embodiments of the present invention, and units/modules of the base station and other operations and/or functions described above are respectively intended to implement corresponding procedures of the methods shown in FIG. 1 and FIG. 3. For brevity, details are not described herein again.

Figure 5:
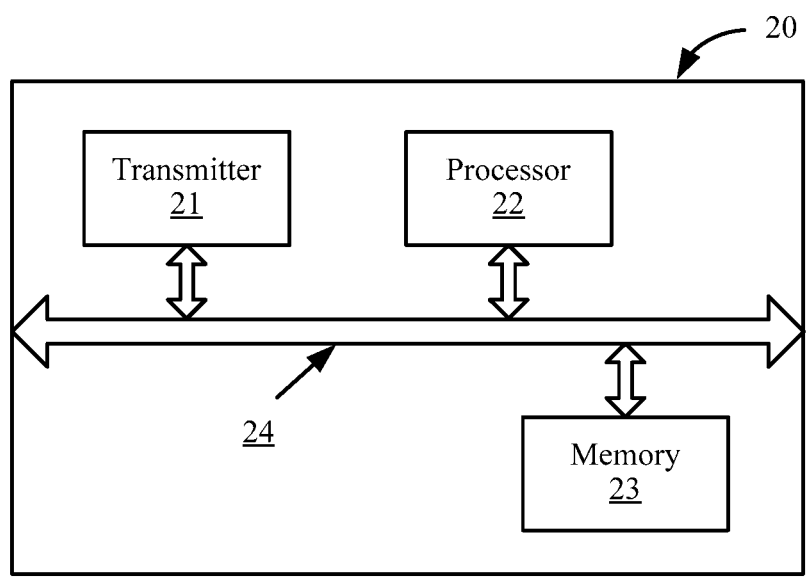
FIG. 5 is a block diagram of a base station according to another embodiment of the present invention.

FIG. 5 is a block diagram of a base station according to another embodiment of the present invention. A base station 20 in FIG. 5 includes a transmitter 21, a processor 22, and a memory 23. The processor 22 controls an operation of the base station 20, and may be configured to process a signal. The memory 23 may include a read-only memory and a random access memory, and provide the processor 22 with an instruction and data. Components of the base station 20 are coupled together by using a bus system 24. In addition to a data bus, the bus system 24 further includes a power bus, a control bus, and a status signal bus. However, for clarity of description, various buses are marked as the bus system 24 in the figure.

The method disclosed in the foregoing embodiments of the present invention may be applied to the transmitter 21 and the processor 22, or may be implemented by the transmitter 21 and the processor 22. In an implementation process, steps of the foregoing methods may be completed by using an integrated logic circuit of hardware in the processor 22 or an instruction in a form of software. The processor 22 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of the present invention. The general purpose processor may be a microprocessor, any conventional processor, or the like. The steps of the methods disclosed in the embodiments of the present invention may be directly performed and completed by a hardware processor, or may be performed and completed by using a combination of hardware in the processor and a software module. The software module may be located in a mature storage medium in the field, such as a random access memory, a flash memory, a read-only memory, a programmable read-only memory, an electrically erasable programmable memory, or a register. The storage medium is located in the memory 23, and the processor 22 reads information in the memory 23 and completes the steps of the foregoing methods in combination with hardware of the processor 22.

Specifically, the processor 22 may process a first baseband signal, a second baseband signal, a third baseband signal, and a fourth baseband signal by using a VAM matrix, to obtain four processed signals; and perform precoding processing on the four processed signals to obtain four coded signals. The four processed signals include a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal.

The transmitter 21 may send the four coded signals to a mobile terminal by using four radio frequency ports, where the four radio frequency ports are in a one-to-one correspondence with the four coded signals.

In this embodiment of the present invention, virtual antenna mapping processing and precoding processing are performed on the four baseband signals, and each coded signal is sent to the mobile terminal by using a corresponding radio frequency port. Therefore, during multi-antenna evolution, there is no need to reduce power of a cell-specific reference signal to ensure that power of transmitting a signal on a radio frequency channel does not exceed a threshold, so that a pilot coverage capability in a multi-antenna technology can be improved.

The base station according to this embodiment of the present invention may correspond to the signal transmission method in the embodiments of the present invention, and units/modules of the base station and other operations and/or functions described above are respectively intended to implement corresponding procedures of the methods shown in FIG. 1 and FIG. 3. For brevity, details are not described herein again.

It should be understood that "one embodiment" or "an embodiment" mentioned in the whole specification means that particular features, structures, or characteristics related to the embodiment are included in at least one embodiment of the present invention. Therefore, "in one embodiment" or "in an embodiment" appearing throughout the specification does not indicate a same embodiment. In addition, these particular features, structures, or characteristics may be combined in one or more embodiments in any appropriate manner.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

It should be understood that in the embodiments of the present invention, "B corresponding to A" indicates that B is associated with A, and B may be determined according to A. However, it should be further understood that determining B according to A does not mean that B is determined according to A only, in other words, B may also be determined according to A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal transmission method, comprising:
   determining, by a base station and based on whether an output power exceeds a threshold, whether to use a virtual antenna mapping (VAM) matrix to process baseband signals;
   in response to determining to use the VAM matrix to process baseband signals, processing, by the base station, a first baseband signal, a second baseband signal, a third baseband signal, and a fourth baseband signal by using the VAM matrix, to obtain four processed signals, wherein the four processed signals comprise a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal;
   performing, by the base station, precoding processing on the four processed signals to obtain four coded signals; and
   sending, by the base station, the four coded signals to a mobile terminal by using four radio frequency ports, wherein the four radio frequency ports are in a one-to-one correspondence with the four coded signals.

2. The method according to claim 1, wherein the VAM matrix is:

$$\frac{1}{\sqrt{2}}\begin{bmatrix} 1 & 0 & 1 & 0 \\ 0 & 1 & 0 & 1 \\ 1 & 0 & 1 & 0 \\ 0 & 1 & 0 & 1 \end{bmatrix}.$$

3. The method according to claim 1, wherein the VAM matrix is any one of the following matrices:

$$\frac{1}{\sqrt{2}}\begin{bmatrix} 1 & 0 & \exp(j*pi/6) & 0 \\ 0 & 1 & 0 & \exp(j*pi/6) \\ 1 & 0 & \exp(j*pi/6) & 0 \\ 0 & 1 & 0 & \exp(j*pi/6) \end{bmatrix},$$

$$\frac{1}{\sqrt{2}}\begin{bmatrix} 1 & 0 & \exp(j*pi/4) & 0 \\ 0 & 1 & 0 & \exp(j*pi/4) \\ 1 & 0 & \exp(j*pi/4) & 0 \\ 0 & 1 & 0 & \exp(j*pi/4) \end{bmatrix},$$

$$\frac{1}{\sqrt{2}}\begin{bmatrix} 1 & 0 & \exp(j*pi/3) & 0 \\ 0 & 1 & 0 & \exp(j*pi/3) \\ 1 & 0 & \exp(j*pi/3) & 0 \\ 0 & 1 & 0 & \exp(j*pi/3) \end{bmatrix}, \text{ or}$$

$$\frac{1}{\sqrt{2}}\begin{bmatrix} 1 & 0 & j & 0 \\ 0 & 1 & 0 & j \\ 1 & 0 & -j & 0 \\ 0 & 1 & 0 & -j \end{bmatrix}.$$

4. The method according to claim 1, wherein the base station is an evolved NodeB (eNB) in Long Term Evolution (LTE).

5. The method according to claim 1, wherein the method further comprises:
   determining, by the base station based on configuration information and power that can be provided by a radio frequency channel, to process the first baseband signal, the second baseband signal, the third baseband signal, and the fourth baseband signal by using the VAM matrix.

6. A base station, comprising:
   a processor, configured to determine, based on whether an output power exceeds a threshold, whether to use a virtual antenna mapping (VAM) matrix to process baseband signals;
   a virtual antenna mapping (VAM) processor, configured to: in response to the processor determining to use the VAM matrix to process baseband signals, process a first baseband signal, a second baseband signal, a third baseband signal, and a fourth baseband signal by using a VAM matrix, to obtain four processed signals, wherein the four processed signals comprise a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal;
   a precoding processor, configured to perform precoding processing on the four processed signals obtained by the VAM processor, to obtain four coded signals; and
   a transmitter, configured to send, to a mobile terminal by using four radio frequency ports, the four coded signals obtained by the precoding processor, wherein the four radio frequency ports are in a one-to-one correspondence with the four coded signals.

7. The base station according to claim 6, wherein the VAM matrix is:

$$\frac{1}{\sqrt{2}}\begin{bmatrix} 1 & 0 & 1 & 0 \\ 0 & 1 & 0 & 1 \\ 1 & 0 & 1 & 0 \\ 0 & 1 & 0 & 1 \end{bmatrix}.$$

8. The base station according to claim 6, wherein the VAM matrix is any one of the following matrices:

$$\frac{1}{\sqrt{2}}\begin{bmatrix} 1 & 0 & \exp(j*pi/6) & 0 \\ 0 & 1 & 0 & \exp(j*pi/6) \\ 1 & 0 & \exp(j*pi/6) & 0 \\ 0 & 1 & 0 & \exp(j*pi/6) \end{bmatrix},$$

$$\frac{1}{\sqrt{2}}\begin{bmatrix} 1 & 0 & \exp(j*pi/4) & 0 \\ 0 & 1 & 0 & \exp(j*pi/4) \\ 1 & 0 & \exp(j*pi/4) & 0 \\ 0 & 1 & 0 & \exp(j*pi/4) \end{bmatrix},$$

$$\frac{1}{\sqrt{2}}\begin{bmatrix} 1 & 0 & \exp(j*pi/3) & 0 \\ 0 & 1 & 0 & \exp(j*pi/3) \\ 1 & 0 & \exp(j*pi/3) & 0 \\ 0 & 1 & 0 & \exp(j*pi/3) \end{bmatrix}, \text{ or}$$

$$\frac{1}{\sqrt{2}}\begin{bmatrix} 1 & 0 & j & 0 \\ 0 & 1 & 0 & j \\ 1 & 0 & -j & 0 \\ 0 & 1 & 0 & -j \end{bmatrix}.$$

9. The base station according to claim 6, wherein the base station is an evolved NodeB (eNB) in Long Term Evolution (LTE).

10. The base station according to claim 6, wherein the base station comprises:
   a processor, configured to determine, based on configuration information and power that can be provided by a radio frequency channel, to process the first baseband signal, the second baseband signal, the third baseband signal, and the fourth baseband signal by using the VAM matrix.

11. A non-transitory computer readable medium, configured to store program code, and the program code includes an instruction for performing operations comprising:
   determining, by a base station and based on whether an output power exceeds a threshold, whether to use a virtual antenna mapping (VAM) matrix to process baseband signals;
   in response to determining to use the VAM matrix to process baseband signals, processing, by the base station, a first baseband signal, a second baseband signal, a third baseband signal, and a fourth baseband signal by using the VAM matrix, to obtain four processed signals, wherein the four processed signals comprise a first processed signal, a second processed signal, a third processed signal, and a fourth processed signal, the first processed signal is the same as the third processed signal, the second processed signal is the same as the fourth processed signal, the first processed signal is obtained by performing superposition on the first baseband signal and the third baseband signal, and the second processed signal is obtained by performing superposition on the second baseband signal and the fourth baseband signal;

performing, by the base station, precoding processing on the four processed signals to obtain four coded signals; and sending, by the base station, the four coded signals to a mobile terminal by using four radio frequency ports, wherein the four radio frequency ports are in a one-to-one correspondence with the four coded signals.

\* \* \* \* \*